United States Patent [19]

Minato

[11] Patent Number: 4,751,486

[45] Date of Patent: Jun. 14, 1988

[54] MAGNETIC ROTATION APPARATUS

[76] Inventor: Kohei Minato, Dear City Akasaka Hitotsugikan No. 303, 2-3, Akasaka 4-chome, Minato-Ku, Tokyo 105, Japan

[21] Appl. No.: 42,432

[22] PCT Filed: Jan. 22, 1987

[86] PCT No.: PCT/JP87/00039

§ 371 Date: Apr. 24, 1987

§ 102(e) Date: Apr. 24, 1987

[87] PCT Pub. No.: WO87/04576

PCT Pub. Date: Jul. 30, 1987

[30] Foreign Application Priority Data

Jan. 24, 1986 [JP] Japan .................................. 61-13061

[51] Int. Cl.$^4$ ............................................. H01F 7/14
[52] U.S. Cl. ..................................... 335/272; 310/156
[58] Field of Search .................... 335/253, 254, 272; 310/77, 156

[56] References Cited

U.S. PATENT DOCUMENTS

| 4,628,199 | 12/1986 | Mueller et al. | 335/272 X |
| 4,647,889 | 3/1987 | Addis | 335/254 X |

FOREIGN PATENT DOCUMENTS

| 50-96740 | 8/1975 | Japan | 335/254 |
| 54-69707 | 6/1979 | Japan | 335/254 |
| 57-34779 | 2/1982 | Japan | 335/254 |
| 57-149654 | 9/1982 | Japan | 335/254 |
| 57-160375 | 10/1982 | Japan | 335/254 |

Primary Examiner—George Harris
Attorney, Agent, or Firm—Brown, Martin, Haller & Meador

[57] ABSTRACT

The magnetic rotation apparatus of the present invention has first and second rotors rotatably supported and juxtaposed. The first and second rotors are connected so as to be rotatable in opposite directions in a cooperating manner. A number of permanent magnets are arranged on a circumferential portion of the first rotor at regular intervals, and just as many permanent magnets are arranged on a circumferential portion of the second rotor at regular intervals. Each permanent magnet has one magnetic polarity located radially outward from the rotors, and has the other magnetic polarity located radially inward toward the rotors. The polarity of each permanent magnet, which is located radially outward from the rotors, is identical. When the first and second rotors are rotated in a cooperating manner, the phase of rotation of the permanent magnets of one rotor is slightly advanced from that of the permanent magnets of the other rotor. One of the permanent magnets of one rotor is replaced with the electromagnet. The radially outward polarity of the electromagnet can be changed by reversing the direction in which a current is supplied to the electromagnet.

6 Claims, 3 Drawing Sheets

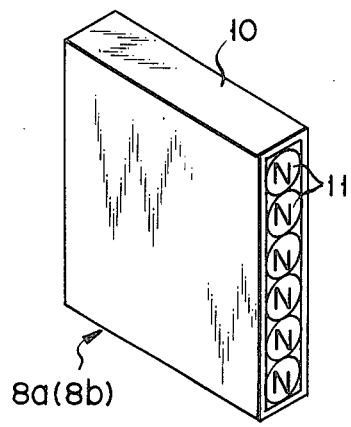
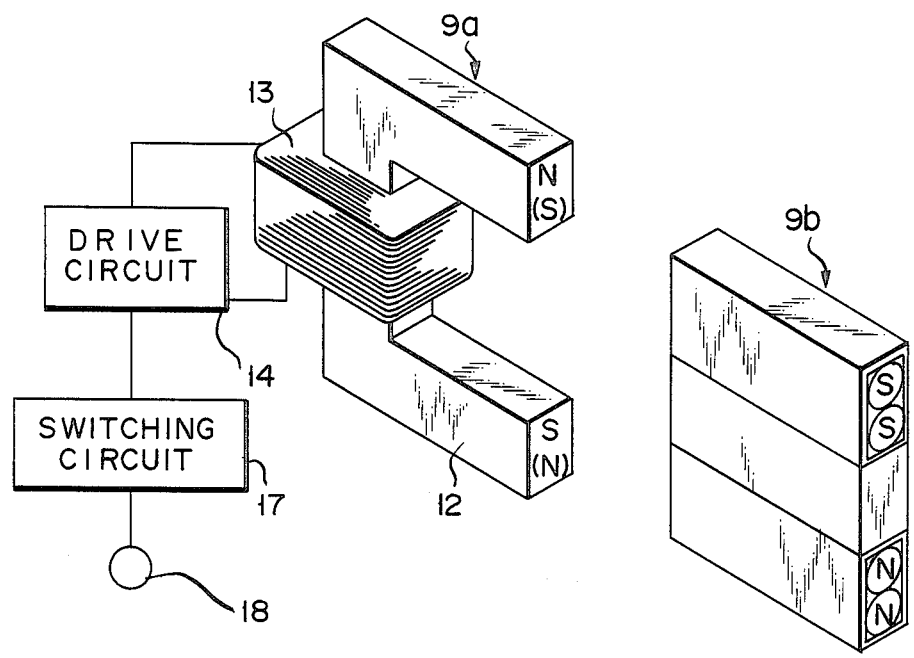

MAGNETIC ROTATION APPARATUS

TECHNICAL FIELD

The present invention relates to a magnetic rotation apparatus in which a pair of rotors are rotated by utilizing a magnetic force.

BACKGROUND ART

An electromotor is well known as a rotation apparatus utilizing a magnetic force. For example, an AC electromotor comprises a rotor having a coil, a stator surrounding the rotor, and a plurality of electromagnets, disposed on the stator, for generating a rotating magnetic field. An electric power must be constantly supplied to the electromagnets in order to generate the rotating magnetic field and keep the rotor rotating, i.e., an external energy, or electric energy, is indispensable for the rotation of the rotor.

Under the circumstances, a magnetic rotation apparatus, which employs permanent magnets in lieu of electromagnets and can rotate a rotor only by a magnetic force of the permanent magnets, is highly desirable.

The present application proposes a magnetic rotation apparatus which comprises a pair of rotors rotatable in opposite directions in a cooperating manner, and a plurality of permanent magnets stationarily arranged at regular intervals on the peripheral portion of each rotor. One end portion of each permanent magnet of both rotors, which has the same polarity, is located radially outward of the rotors. When the two rotors are rotated in a cooperating fashion, a permanent magnet on one rotor and a corresponding permanent magnet on the other, which form a pair, approach and move away from each other periodically. In this case, the phase of rotation of the magnet on one rotor advances a little from that of the corresponding magnet on the other rotor. When the paired permanent magnets approach each other, magnetic repulsion causes one rotor to rotate. The rotation of one rotor is transmitted to the other rotor to rotate the same. In this manner, other pairs of magnets on both rotors sequentially approach each other, and magnetic repulsion occurs incessantly. As a result, the rotors continue to rotate.

In the above apparatus, in order to stop the rotation of the rotors, a brake device is required. If an ordinary brake device is mounted on the magnetic rotation apparatus, the entire structure of the apparatus becomes complex, and a driving source for the brake device must be provided separately.

The present invention has been developed in consideration of the above circumstances, and its object is to provide a magnetic rotation apparatus including a brake device for suitably stopping the rotation of rotors.

DISCLOSURE OF THE INVENTION

The magnetic rotation apparatus of the present invention is provided with magnetic force conversion means which is substituted for at least one pair of permanent magnets of the paired rotors. In a normal state, the magnetic force conversion means causes a magnetic repulsion, as in the other pairs of permanent magnets. When it is intended for the rotors to stop, the magnetic force conversion means causes a magnetic attraction force. Since a magnetic attraction force can be produced between the rotors at any time, the magnetic attraction force serves to stop the rotors. The brake device constituted by the magnetic force conversion means differs from an ordinary brake device which forcibly stops a pair or rotors by using a frictional force. In the brake device of this invention, by converting a magnetic repulsion force to a magnetic attraction force, the rotors can be braked in the state that the movement of the rotors is reduced. Thus, the rotors can be stopped effectively.

BRIEF DESCRIPTION OF THE DRAWINGS

FIG. 3 is a perspective view of a permanent magnet;

FIG. 4 shows an electromagnet, a permanent magnet cooperating with the electromagnet, and a driving circuit the electromagnet.

BEST MODE OF CARRYING OUT THE INVENTION

Figure 1:
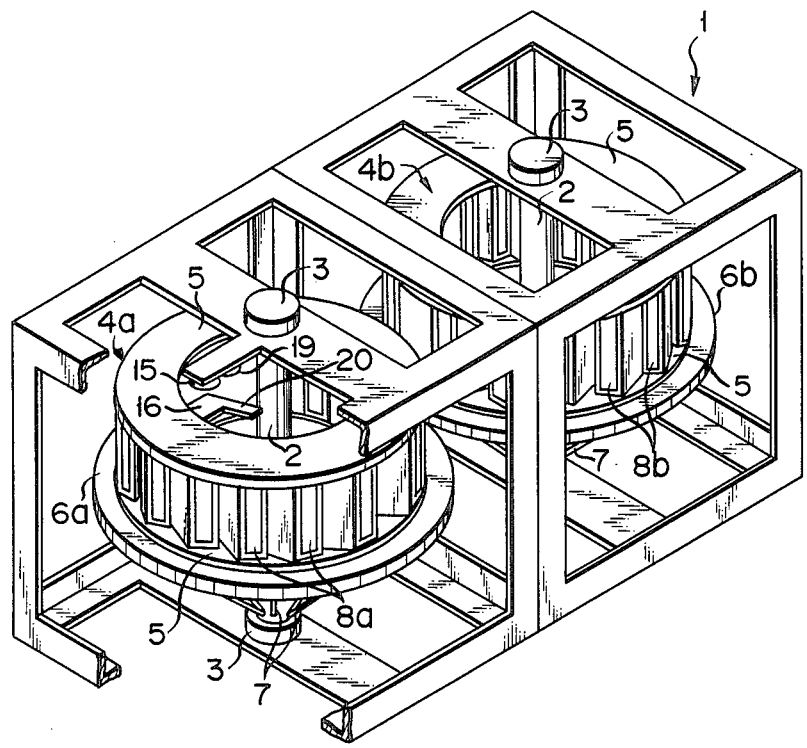
FIG. 1 is a schematic perspective view showing a magnetic rotation apparatus according to an embodiment of the invention.

FIG. 1 shows a magnetic rotation apparatus embodying the present invention. The magnetic rotation apparatus has frame 1. Frame 1 is provided with a pair of rotation shafts 2 which extend vertically and in parallel to each other. Shafts 2 are located at a predetermined distance from each other. Upper and lower ends of each shaft 2 are rotationally supported on frame 1 via bearing 3.

First rotor 4a is mounted on one of rotation shafts 2, second rotor 4b is mounted on the other rotation shaft 2. First and second rotors 4a and 4b are arranged on the same level. Rotors 4a and 4b have similar structures. For example, each rotor 4a (4b) comprises two ring-shaped plates 5 which are spaced apart from each other in the axial direction of the rotation shaft 2.

Gears 6a and 6b made of synthetic resin are, as cooperating means, attached to lower surfaces of first and second rotors 4a and 4b. The diameters of gears 6a and 6b are identical but larger than those of rotors 4a and 4b. Gears 6a and 6b mesh with each other. First and second rotors 4a and 4b are thus rotatable in opposite directions in a cooperating manner. In FIG. 1, reference numeral 7 indicates support arms for supporting first and second rotors 4a and 4b.

Figure 2:
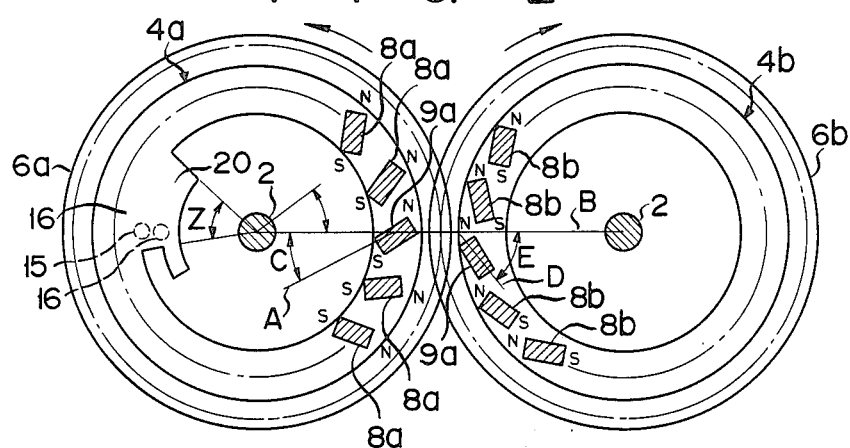
FIG. 2 is a schematic plan view showing the relationship between the first and second rotors.

For example, 16 magnets are arranged at regular intervals on a peripheral portion of first rotor 4a. These magnets are secured between two ring-shaped plates 5. In this embodiment, among the 16 magnets, one is electromagnet 9a (see FIG. 2), and the others are permanent magnets 8a. FIG. 2 shows only some of permanent magnets 8a.

As shown in FIG. 3, permanent magnet 8a comprises case 10, and a plurality of rod-like ferromagnetic members 11 housed in case 10. Ferromagnetic member 11 is, for example, a ferrite magnet. Ferromagnetic members 11 of each permanent magnet 8a are arranged such that ferromagnetic members 11 have the same polarity at one end. In first rotor 4a, for example, an N-polarity end portion of each permanent magnet 8a faces radially outward, and an S-polarity end portion of magnet 8a faces radially inward. As shown in FIG. 2, when each permanent magnet 8a is located between two shafts 2, angle C formed by longitudinal axis A of magnet 8a and imaginary line B connecting two shafts 2 is, for example, set to 30° C. On the other hand, electromagnet 9a is, as shown in FIG. 4, constituted by U-shaped iron core 12, and coil 13 wound around core 12. Electromagnet 9a is arranged such that both N- and S-polarity end portions face radially outward of first rotor 4a, and the above-mentioned angle C is formed, similarly to the case of permanent magnet 8a.

The same number of permanent magnets (8b,9b) as the total number of all permanent magnets and electromagnet (8a,9a) of first rotor 4a are secured on a peripheral portion of second rotor 4b at regular intervals. In FIG. 2, when first and second rotors 4a and 4b are rotated in opposite directions, each permanent magnet of second rotor 4b periodically moves toward and away from the corresponding one of the magnets (8a,9a) of first rotor 4a.

The permanent magnets (8b,9b) of second rotor 4b will now be described in greater detail. Permanent magnets 8b of second rotor 4b, which periodically move toward and away from permanent magnets 8a of first rotor 4a in accordance with the rotation of rotors 4a and 4b, have a structure similar to that of permanent magnets 8a of first rotor 4a. The polarity of that end portion of each permanent magnet 8b which is located radially outward from second rotor 4b, is identical with that of the end portion of each permanent magnet 8a of first rotor 4a. That is, the radially outward portion of each permanent magnet 8b has an N-polarity.

Permanent magnet 9b of second rotor 4b, which periodically moves toward and away from electromagnet 9a of first rotor 4a, has a structure shown in FIG. 4. Permanent magnet 9b has a structure similar to that of permanent magnets 8a. Both polarities of electromagnet 9a face radially outward from first rotor 4a. Permanent magnet 9b has two different polarities which face radially outward from second rotor 4b and correspond to both polarities of electromagnet 9a.

As shown in FIG. 2, when each permanent magnet 8b,9b is located between two rotation shafts 2, angle E formed by longitudinal axis D of the magnet (8b,9b) and imaginary line B connecting two shafts 2 is, for example, set to 56° C. In addition, when rotors 4a and 4b are rotated in opposite directions, as shown by arrows, the magnets (8a,9a) of first rotor 4a move a little ahead of the corresponding permanent magnets (8b,9b) of second rotor 4b, in a region in which both magnets (8a,9a; 8b,9b) approach one another. In other words, the phase of rotation of the magnets (8a,9a) of first rotor 4a advances by a predetermined angle in relation to the permanent magnets (8b,9b) of second rotor 4b.

As shown in FIG. 4, electromagnet 9a of first rotor 4a is electrically connected to drive circuit 14. Drive circuit 14 includes a power source for supplying an electric current to coil 13 of electromagnet 9a. While rotors 4a and 4b rotate, drive circuit turns on electromagnet 9a upon receiving a signal from first sensor 15 only when electromagnet 9a and permanent magnet 9b are in a first region in which they periodically approach each other. First sensor 15 is an optical sensor comprising a light-emitting element and a light-receiving element. As shown in FIG. 1, first sensor 15 is attached to a portion of frame 1 above first rotor 4a. First sensor 15 emits light in a downward direction. The light is reflected by reflection plate 16 projecting radially inward from the inner edge of first rotor 4a. First sensor 15 receives the reflected light, and feeds a signal to drive circuit 14. Thus, drive circuit 14 turns on electromagnet 9a.

The circumferential length of reflection plate 16 is equal to that of the above-mentioned first region. When magnets 9a and 9b enter the first region, first sensor 15 is turned on, and when they leave the first region, first sensor 15 is turned off. When drive circuit 14 receives a signal from first sensor 15, it excites electromagnet 9a such that both polarities of electromagnet 9a correspond to those of permanent magnet 9b of second rotor 4b.

Drive circuit 14 is electrically connected to switching circuit 17. When brake switch 18 is operated, switching circuit 17 reverses the direction in which an electric current is supplied to electromagnet 9a. When the current supplying direction of drive circuit 14 is reversed, drive circuit 14 excites electromagnet 9a only in a time period in which drive circuit 14 receives a signal from second sensor 19. Second sensor 19 has a structure similar to that of first sensor 15, and is attached to frame 1 so as to be located closer to the center of rotor 4a than first sensor 15. Reflection plate 20, which corresponds to the position of second sensor 19, is formed integral to an inner edge portion of reflection plate 16. As shown in FIG. 2, compared to reflection plate 16, reflection plate 20 extends in rotational direction of first rotor 4a, indicated by the arrow.

The operation of the above-described magnetic rotation apparatus will now be explained with reference to FIG. 5.

Figure 5:
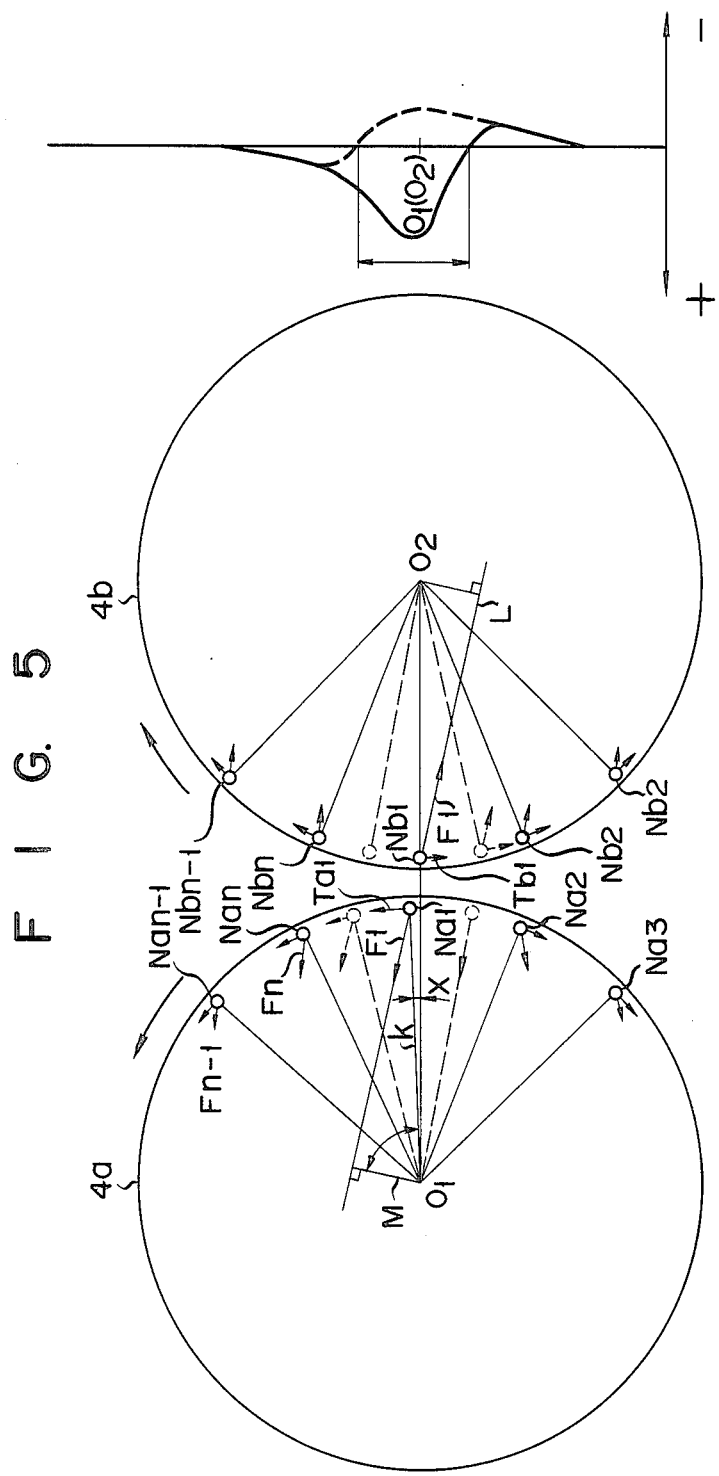
FIG. 5 is a view for explaining how a pair of rotors rotate.

In FIG. 5, rotation shaft 2 of first rotor 4a is denoted by 01, and rotation shaft 2 of second rotor 4b is denoted by 02. Only the radially outward polarity, that is, N-polarity, of the magnets of rotors 4a and 4b is shown, for the sake of convenience. Although electromagnet 9a and permanent magnet 9b have both polarities located radially outward, only the N-polarity thereof is shown.

When first and second rotors 4a and 4b are put in a position shown in FIG. 5, magnetic pole Nb1 of one permanent magnet of second rotor 4b is located in a line connecting shafts 01 and 02. In this case, polarity Na1 of first rotor 4a, which is paired with polarity Nb1, is a little advanced from polarity Nb1 in the rotational direction of first rotor 4a. For example, as shown in FIG. 5, magnetic pole Na1 is advanced from polarity Nb1 by an angle of X°. Polarities Na1 and Nb1 exert repulsion force F1 upon each other along line L. Supposing that an angle, formed by line M, which is drawn from shaft 01 perpendicularly to line L, and the line connecting shafts 01 and 02 is represented by Y, and that the length of line K is represented by R, torques Ta1 and Tb1 caused by repulsion force F1 to rotate first and second rotors 4a and 4b can be given by:

$$Ta1 = F1 \cdot R \cdot \cos(Y - X)$$

$$Tb1 = F1 \cdot R \cdot \cos Y$$

Since $\cos(Y - X) > \cos Y$, $Ta1 > Tb1$.

As shown in FIG. 5, since magnetic pole Na1 is advanced from magnetic pole Nb1 by angle X°, first rotor 4a receives a greater torque than second rotor 4b. Thus, first rotor 4a forwardly rotates in the direction of the arrow in FIG. 5.

Mention is now made of paired magnets of rotors 4a and 4b in the vicinity of magnetic poles Na1 and Nb1. Magnetic poles Nan and Nan−1 of first rotor 4a are advanced ahead of magnetic pole Na1 in the rotational direction. Magnetic poles Nan and Nan−1 receive a torque produced by a repulsion force acting between magnetic poles Nan and Nan−1 and corresponding magnetic poles Nbn and Nbn−1. In FIG. 5, magnetic poles Nan and Nan−1 receive a smaller torque, as they rotate farther from the location of magnetic pole Na1. It is well known that a torque of first rotor 4a, which is caused by a repulsion force acting on magnetic poles Nan and Nan−1, is decreased in inverse proportion to the square of the distance between paired magnetic poles Na and Nb.

Magnetic poles Na2 and Na3, behind magnetic pole Na1, receive a torque which tends to rotate rotor 4a in the reverse direction. This torque is considered to be counterbalanced with the torque acting on magnetic poles Nan and Nan−1.

In FIG. 5, attention should be paid to the region of magnetic poles Na1 and Na2. As first rotor 4a forwardly rotates, the direction in which a torque applies to magnetic pole Na2, is changed from the reverse direction to the forward direction, before magnetic pole Na2 reaches the position of magnetic pole Na1. The torque for forwardly rotating rotor 4a is larger than that for reversely rotating rotor 4a. Therefore, first rotor 4a is easily rotated in the direction shown in FIG. 2.

Second rotor 4b is considered to receive a torque in a direction reverse to the direction shown in FIG. 2, as seen from the description of first rotor 4a. It is obvious that second rotor 4b receives a maximum torque at the position of magnetic pole Nb1. As seen from the above formula, torque Tb1 applied to second rotor 4b in a direction reverse to that denoted by the arrow is smaller than torque Ta1 applied to first rotor 4a in the forward direction. The rotation of first rotor 4a is transmitted to second rotor 4b through gears 6a and 6b. By determining the relationship between the strengths of torques Ta1 and Tb1, second rotor 4b is thus rotated in a direction reverse to the rotational direction of first rotor 4a, against the torque applied to second rotor in the direction. As a result, first and second rotors 4a and 4b are kept rotating, since a torque for rotating rotors 4a and 4b in a cooperating manner is produced each time magnetic poles Na of first rotor 4a pass across the line connecting shafts 01 and 02.

In a diagram shown in the right part of FIG. 5, a solid line indicates a torque applied to first rotor 4a, and a broken line indicates a torque applied to second rotor 4b. The ordinate indicates a distance between each magnetic pole and the line connecting shafts 01 and 02 of rotors 4a and 4b. The first region in which electromagnet 9a of first rotor 4a is turned on is set in a range of Z during which a torque is applied to first rotor 4a in the forward direction.

In order to stop the cooperative rotation of rotors 4a and 4b, brake switch is turned on to operate switching circuit 17. Thus, the direction in which drive circuit 14 supplies a current to electromagnet 9a is reversed. The polarities of electromagnet 9a are reversed. The torque applied to electromagnet 9a in the forward direction is stopped. When electromagnet 9a approaches permanent magnet 9b, a magnetic attraction force is produced. As a result, the rotation of rotors 4a and 4b is effectively slowed down and stopped. Since the second region, in which electromagnet 9a is excited, is larger than the first region, a large braking force can be obtained from a magnetic attraction force.

In the above embodiment, since electromagnet 9a is excited only in a specific region, a large electric power is not required. In addition, since electromagnet 9a rotates and brakes rotors 4a and 4b, a braking mechanism for a magnetic rotation apparatus can be obtained without having to make the entire structure of the apparatus complex.

The present invention is not restricted to the above embodiment. With the exception of the paired electromagnet and permanent magnet, all permanent magnets of the rotors are arranged such that their end portions of the same polarity face radially outward from the rotors. However, it is possible that the polarities of the radially outward end portions of the permanent magnets are alternately changed. Namely, it should suffice if the polarities of the radially outward end portions of the first rotor are identical to those of the corresponding radially outward end portions of the second rotor. The magnets may have different magnetic forces. Furthermore, an electric power for exciting the electromagnet can be derived from the rotation of the rotors or from the revolving magnetic field of the permanent magnet.

Angles C and E are not restricted to 30° and 56°. They may be freely determined in consideration of the strength of the magnetic force of the permanent magnet, a minimum distance between adjacent magnets, angle x, and the like. The number of magnets of the rotor is also freely chosen.

Industrial Applicability

As described above, the magnetic rotation apparatus of the present invention can be used as a driving source in place of an electric motor, and as an electric generator.

I claim:

1. A magnetic rotation apparatus comprising:
   a first rotor which is rotatably supported;
   a second rotor which is rotatably supported, and juxtaposed with said first rotor;
   cooperating means for enabling said first and second rotors to rotate in opposite directions; and
   magnet elements arranged at regular intervals on the peripheral portion of each of said first and second rotors, the number of the magnet elements arranged on the first rotor being equal to that of the magnet elements on the second rotor,
   characterized in
   that each magnet element has at least one magnetic pole located radially outward from each rotor,
   that, when the first and second rotors are rotated in a cooperating manner, any one of the magnets of the first rotor, and any of the magnets of the second rotor, which constitute a pair, move such that their magnetic poles having the same polarity approach and move away from each other periodically;
   that one of the paired magnet elements has a phase of rotation a little advanced from that of the other;
   that, when the paired magnet elements approach each other, a magnetic repulsion force is produced to exert a torque to the first rotor in one direction, and the torque of the first rotor is transmitted to the second rotor through said cooperating means, thus allowing the second rotor to rotate against a torque applied to the second rotor due to said magnetic repulsion force; and
   that one of at least a pair of magnet elements is provided with magnetic force switching means for changing the polarity of said one magnet element.

2. The apparatus according to claim 1, wherein said cooperating means is a pair of intermeshing gears provided on the first and second rotors.

3. The apparatus according to claim 2, wherein said magnetic force switching means comprises an electromagnet, which is one of a pair of magnet elements, exciting means for exciting said electromagnet, and switching means for changing the polarity of said electromagnet by changing the current supply direction of the exciting means, all magnet elements excluding said electromagnet being permanent magnets.

4. The apparatus according to claim 3, wherein said electromagnet of one rotor has two magnetic polarities located radially outward from said one rotor, and the magnet element of the other rotor, which is paired with said electromagnet, has two magnetic polarities which are located radially outward from said other rotor so as to correspond to said two magnetic polarities of the electromagnet, said two polarities of the electromagnet being opposite to each other.

5. The apparatus according to claim 4, wherein each permanent magnet of both rotors, excluding the permanent magnet paired with the electromagnet, has one magnetic polarity located radially outward from the rotors and the other magnetic polarity located radially inward toward the rotors.

6. The apparatus according to claim 5, wherein each permanent magnet of both rotors, excluding the permanent magnet paired with the electromagnet, has the same magnetic polarity located radially outward from the rotors.

* * * * *